US010224761B2

(12) United States Patent
Jung et al.

(10) Patent No.: US 10,224,761 B2
(45) Date of Patent: Mar. 5, 2019

(54) METHOD FOR CONTROLLING POWER IN A WIRELESS POWER TRANSMISSION APPARATUS AND A WIRELESS POWER TRANSMISSION APPARATUS

(75) Inventors: Chun-Kil Jung, Seoul (KR); Yoon-Sang Kuk, Seoul (KR)

(73) Assignee: GE HYBRID TECHNOLOGIES, LLC, Niskayuna, NY (US)

( * ) Notice: Subject to any disclaimer, the term of this patent is extended or adjusted under 35 U.S.C. 154(b) by 479 days.

(21) Appl. No.: 13/428,415

(22) Filed: Mar. 23, 2012

(65) Prior Publication Data

US 2012/0242276 A1 Sep. 27, 2012

(30) Foreign Application Priority Data

Mar. 24, 2011 (KR) ........................ 10-2011-0026500

(51) Int. Cl.
*H02J 7/00* (2006.01)
*H02J 50/60* (2016.01)
*H02J 50/70* (2016.01)
*H02J 50/80* (2016.01)
*H02J 50/12* (2016.01)
*H02J 50/40* (2016.01)
*H02J 5/00* (2016.01)
*H02J 7/02* (2016.01)
*H02J 7/04* (2006.01)

(52) U.S. Cl.
CPC ............. *H02J 50/60* (2016.02); *H02J 5/005* (2013.01); *H02J 7/025* (2013.01); *H02J 7/04* (2013.01); *H02J 50/12* (2016.02); *H02J 50/40* (2016.02); *H02J 50/70* (2016.02); *H02J 50/80* (2016.02)

(58) Field of Classification Search
CPC ............. H02J 5/005; H02J 50/00; H02J 50/90
USPC ................................... 320/107, 108; 307/104
See application file for complete search history.

(56) References Cited

U.S. PATENT DOCUMENTS

2005/0017677 A1* 1/2005 Burton et al. ................ 320/108
2005/0068019 A1* 3/2005 Nakamura ................ G06F 1/26
                                                           323/355
2008/0197802 A1  8/2008 Onishi et al. ................ 320/106
(Continued)

FOREIGN PATENT DOCUMENTS

JP         2000134816 A      5/2000
JP         2005278303 A     10/2005
(Continued)

OTHER PUBLICATIONS

European Search Report dated Jul. 5, 2012, issued in corresponding European Application No. 12 160 833.5.
(Continued)

*Primary Examiner* — Zixuan Zhou
(74) *Attorney, Agent, or Firm* — DeLizio Law, PLLC

(57) ABSTRACT

A power control method for a wireless power transmission assembly, and the wireless power transmission assembly. The method includes: outputting a direct current voltage to a wireless power transmission apparatus, the direct current voltage generated from an alternating current power source in an adaptor; and changing the level of the direct current voltage in the adaptor based on a voltage change communication signal if the wireless power transmission apparatus transmits the voltage change communication signal to the adaptor.

11 Claims, 5 Drawing Sheets

(56) References Cited

U.S. PATENT DOCUMENTS

| | | | | |
|---|---|---|---|---|
| 2009/0206791 A1* | 8/2009 | Jung | ................... | H02J 7/00 320/108 |
| 2010/0084918 A1* | 4/2010 | Fells | ................ | H02J 5/005 307/32 |
| 2011/0018679 A1* | 1/2011 | Davis et al. | ............... | 340/3.1 |

FOREIGN PATENT DOCUMENTS

| | | | | |
|---|---|---|---|---|
| JP | 2010-220284 A | 9/2010 | | |
| KR | 10-2007-0015264 | 2/2007 | | |
| KR | 10-2011-0026027 | 3/2011 | | |
| WO | WO 2006001557 A1 * | 1/2006 | ............ | H02J 7/025 |
| WO | WO 2010-035545 | 1/2010 | | |
| WO | 2010068063 A2 | 6/2010 | | |

OTHER PUBLICATIONS

English-language abstract of Publication No. WO2004-073150.
Korean Office Action dated May 29, 2012, issued in corresponding Korean Patent Application No. 10-2011-0026500.
Office Action issued by the Japanese Patent Office dated Feb. 2, 2016 for the corresponding Japanese Application No. 2012-067865.

* cited by examiner

METHOD FOR CONTROLLING POWER IN A WIRELESS POWER TRANSMISSION APPARATUS AND A WIRELESS POWER TRANSMISSION APPARATUS

CROSS-REFERENCE TO RELATED APPLICATIONS

This application claims the benefit of Korean Application No. 10-2011-0026500, filed Mar. 24, 2011, in the Korean Intellectual Property Office, the disclosure of which is incorporated herein by reference.

BACKGROUND

1. Field

The following description relates to a power control method in a wireless power transmission assembly that reduces manufacturing costs by reducing the number of components and increases wireless power transmission efficiency, and a wireless power transmission assembly.

2. Description of the Related Art

Generally, a battery pack receives electrical energy from an external charging device and, in a charged state, supplies the energy to a portable device, such as a mobile phone or a Personal Digital Assistant (PDA), for the portable device's operation. The battery pack includes a battery cell for storing the electric energy and a circuit for charging and discharging the battery cell, the discharging being for the purpose of supplying the electrical energy to the portable device.

A common method for establishing an electrical connection between the battery pack and the charging device thereby charging the battery pack with the electrical energy to be used in the portable device, includes a terminal supplying method for receiving the commercial electricity, converting the commercial electricity into voltage and current corresponding to the battery pack configuration, and supplying the electric energy to the battery pack via the battery pack terminal.

However, when the electrical energy is supplied by the above terminal supplying method, an instantaneous discharge phenomenon can occur when the charging device and the battery pack come in contact or are separated from each other, since the terminals of the battery pack and the charging device may have different potential differences.

This instantaneous discharge phenomenon is a particular problem when foreign objects are placed in contact with the terminals, as a fire may break out.

An additional problem is that the electrical energy in the battery pack is naturally discharged into the environment via the battery pack terminal due to moisture. This discharge reduces the lifespan and deteriorates the performance of the battery pack.

Recently, controlling methods and charging systems of a non-contact type, using a wireless power transmission method, have been suggested to solve the above-mentioned problems.

SUMMARY

An embodiment of the present application is a power control method in a wireless power transmission assembly that reduces manufacturing costs by reducing the number of components and increases wireless power transmission efficiency, and a wireless power transmission assembly.

To achieve one embodiment of the present application, provided is a method for controlling power in a wireless power transmission assembly, the method including: outputting a direct current voltage to a wireless power transmission apparatus, the direct current voltage generated from an alternating current power source in an adaptor; and changing a level of the direct current voltage in the adaptor based on a voltage change communication signal if the wireless power transmission apparatus transmits the voltage change communication signal to the adaptor. It would be appreciated by those skilled in the art that other embodiments are possible without departing from the principles and spirit of the invention.

In one embodiment, the adaptor and the wireless power transmission apparatus are connected by a plus line, a ground line, and a communication line. During the changing of the level of the direct current voltage, the voltage change communication signal which the wireless power transmission apparatus transmits to the adaptor is based on an amplitude modulation signal or a serial communication signal, which is transmitted through the communication line.

In one embodiment, the voltage change communication signal includes at least one of a power up signal and a power down signal based on a charging state signal from the wireless power receiving apparatus.

In one embodiment, the wireless power transmission apparatus includes a plurality of transmission coils, and the method further includes: detecting a wireless power receiving apparatus through any one of the transmission coils; and transmitting the voltage change communication signal through the transmission coil where the wireless power receiving apparatus is detected.

As an alternative embodiment, the adaptor and the wireless power transmission apparatus are connected by a plus line and a ground line. In such a configuration, the changing of the level of the direct current voltage in the adaptor includes transmitting a voltage up signal or a voltage down signal through the plus line using DC modulation.

In one embodiment, the changing of the level of the direct current voltage in the adaptor includes changing the level of the direct current voltage by adjusting an offset voltage of the adaptor.

To achieve another embodiment of the present application, provided is a wireless power transmission assembly, including: an adaptor which changes an alternating current power source to a direct current voltage and to output the direct current voltage; and a wireless power transmission apparatus which transmits a wireless power signal using the direct current voltage outputted from the adaptor, the wireless power transmission apparatus including a transmission controller which transmits a voltage change communication signal to the adaptor, and the adaptor changes the level of the direct current voltage based on the voltage change communication signal if the wireless power transmission apparatus transmits the voltage change communication signal. It would be appreciated by those skilled in the art that other embodiments are possible without departing from the principles and spirit of the invention.

In one embodiment, the adaptor and the wireless power transmission apparatus are connected by a plus line, a ground line, and a communication line. The transmission controller transmits the voltage change communication signal in the form of an amplitude modulation signal or a serial communication signal transmitted through the communication line.

In one embodiment, the adaptor includes a communication controller to receive the voltage change communication signal, and an output voltage controller to control the direct voltage in response to the voltage change communication signal.

In one embodiment, the voltage change communication signal includes at least one of a power up signal and a power down signal based on a charging state signal from a wireless power receiving apparatus.

In one embodiment, the wireless power transmission apparatus includes a plurality of transmission coils. The transmission controller detects a wireless power receiving apparatus through any one of the transmission coils, and transmits the voltage change communication signal through the transmission coil where the wireless power receiving apparatus is detected.

In one embodiment, the transmission controller detects the wireless power receiving apparatus through the load modulation of the first transmission coil and the second transmission coil.

As an alternative embodiment, the adaptor and the wireless power transmission apparatus are connected by a plus line and a ground line, and the transmission controller transmits a voltage up signal or a voltage down signal through the plus line by using DC modulation.

In one embodiment, the transmission controller changes the level of the direct current voltage by adjusting an offset voltage of the adaptor.

According to an exemplary embodiment of the present application, when the output voltage from the adaptor is controlled directly by the wireless power transmission apparatus, the manufacturing costs may be decreased by reducing the number of components and the wireless power transmission efficiency may be increased.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1A:
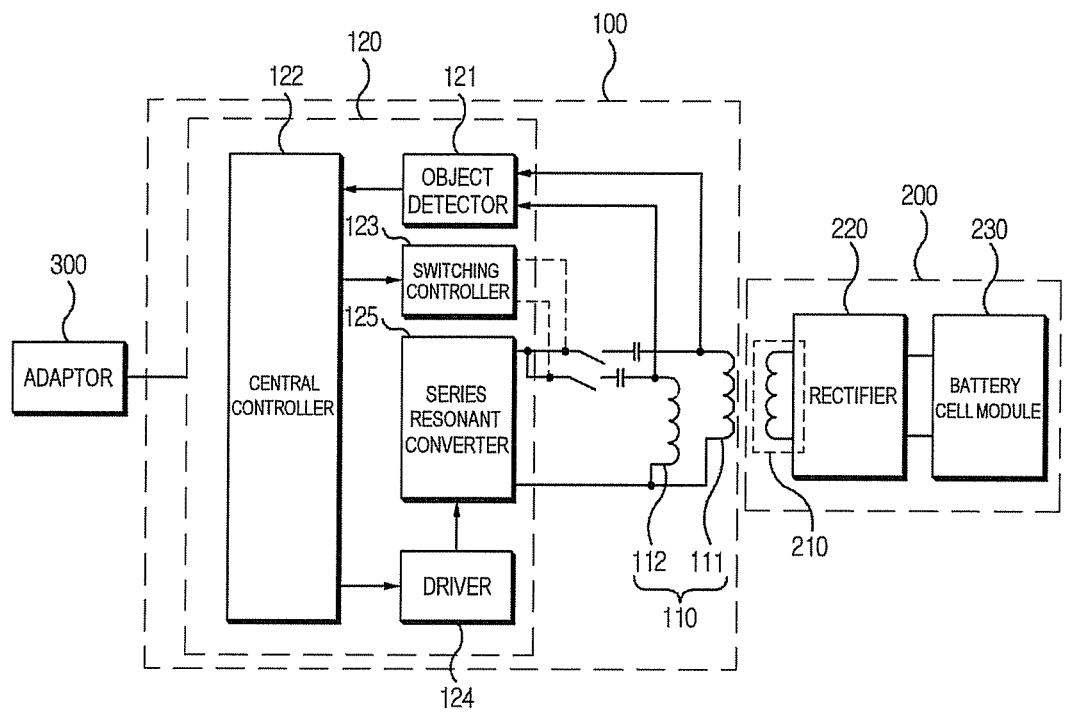
FIG. 1a is a block diagram showing a wireless power transmission assembly according to an exemplary embodiment.

Reference will now be made in detail to the present embodiments of the present application, examples of which are illustrated in the accompanying drawings, wherein like reference numerals refer to the like elements throughout. The embodiments are described below in order to explain the present application by referring to the figures.

Hereinafter, a method for controlling power in a wireless power transmission assembly, and the wireless power transmission assembly thereof, will be described in detail with reference to the accompanying drawings. The suffixes "module", "-er" and "-or" used in the detailed description are given to the constituent elements to take advantage of the ease in writing the description. The suffixes may be optionally used and do not have a distinct difference or role in themselves.

FIG. 1a is a block diagram showing a wireless power transmission assembly according to an exemplary embodiment. It would be appreciated by those skilled in the art that other embodiments are possible without departing from the principles and spirit of the invention.

As shown in FIG. 1a, the wireless power transmission assembly includes a wireless power transmission assembly includes a wireless power transmission apparatus 100, an adaptor 300 which converts alternating current (AC) to direct current (DC), and a wireless power receiving apparatus 200. Based on electromagnetic induction, when the wireless power transmission apparatus 100 changes a direct current voltage received via the adaptor 300 into a wireless power signal and transmits the wireless power signal to the wireless power receiving apparatus 200, the wireless power receiving apparatus 200 uses the power of the wireless power signal to charge a battery or supplies the power to electronic equipment connected to the wireless power receiving apparatus 200.

The following paragraphs describe configurations of the wireless power transmission apparatus 100 and the wireless power receiving apparatus 200.

The wireless power transmission apparatus 100 according to an exemplary embodiment includes a transmission coil 110 and a transmission controller 120. The transmission coil 110 is an apparatus which transmits a power signal to a reception coil 210 of the wireless power receiving apparatus 200 using electromagnetic induction. According to this exemplary embodiment, a plurality of transmission coils may be adopted. Although for convenience the description will refer to a first transmission coil 111 and a second transmission coil 112 hereinafter, it would be appreciated by those skilled in the art that one or more than two transmission coils are possible without departing from the principles and spirit of the invention.

Configurations of a plurality of transmission coils will later be described below in detail with reference to FIGS. 4a and 4b.

With reference to FIG. 1a again, the transmission controller 120 controls the transmission coil 110 and may include an object detector 121, a central controller 122, a switching controller 123, a driver 124 and a series resonant converter 125.

The object detector 121 detects a load change on the transmission coil 110, determines whether an object detected by the load change is the wireless power receiving apparatus 200—i.e., functions as an identification (ID) checker—and filters and processes a charging state signal transmitted from the wireless power receiving apparatus 200. That is, when an ID response signal, in a response to an ID call signal transmitted via the transmission coil 110, is received, the object detector 121 filters and processes the ID signal, and then filters and processes a charging state signal transmitted via the transmission coil 110.

The central controller 122 receives and checks the determination result of the object detector 121, analyzes a charging state signal and an ID check signal received from the transmission coil 110, and transmits a power controlling signal designating a required power value to the driver 124. Also, the central controller 122 transmits a voltage change communication signal to the adaptor 300 to control an output voltage of the adaptor in a manner described below.

In other words, the central controller 122 analyzes and processes a data signal filtered in the object detector 121, and correspondingly controls the driver 124 and an output voltage of the adaptor.

The switching controller 123 controls a switching operation between the first transmission coil 111 and the second transmission coil 112, and operates with the series resonant converter 125.

The driver 124 controls the operation of the series resonant converter 125 according to the instructions of the central controller 122.

The series resonant converter 125 generates the transmission power according to the instructions of the driver 124 and supplies the transmission power to the primary core 110. In other words, when the central controller 122 transmits the power controlling signal designating a required power value to the driver 124, the driver 124 controls the operation of the series resonant converter 125 according to the instructions of the transmitted power controlling signal. Also, the series resonant converter 125 applies the transmission power at the required power level, according to the instructions of the driver 124, to the transmission coil 110 to transmit a wireless power signal. The strength of the generated wireless power signal may be based on the output voltage of the adaptor 300. The transmission controller 120 changes the output voltage of the adaptor 300 by transmitting a voltage change communication signal to the adaptor 300; this signal may be sent via a cable or wirelessly.

In addition, the series resonant converter 125 supplies the power to generate a first object detecting signal and a second object detecting signal via each of the first transmission coil 111 and the second transmission coil 112 according to the instructions of the driver 124.

The wireless power receiving apparatus 200 includes a reception coil 210, a rectifier 220, and a battery cell module 230. The reception coil 210 generates an induced power by the transmitted wireless power signal. The rectifier 220 rectifies the induced power. The battery cell module 230 charges the battery cell with the rectified power.

The battery cell module 230 includes protection circuits such as a temperature-detecting circuit, and overvoltage and overcurrent prevention circuits. The battery cell module 230 also includes a charging management module to collect and process information on a charging state of the battery cell.

Figure 1B:
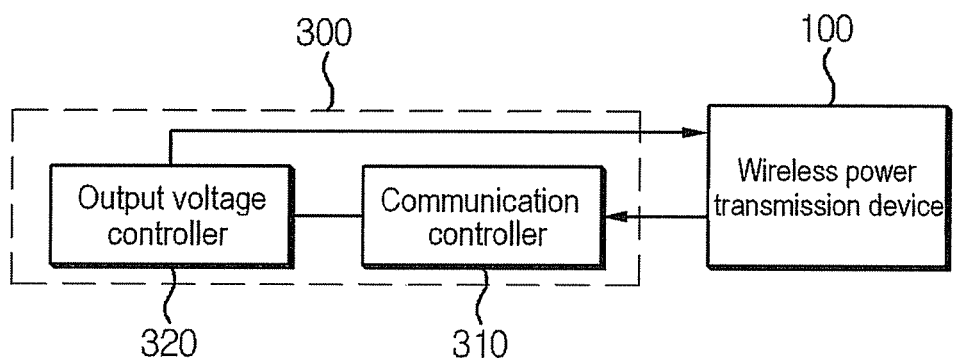
FIG. 1b is a block diagram showing an adaptor of a wireless power transmission assembly according to an exemplary embodiment.

The adaptor 300 is a device to convert an AC commercial power of 220V or 110V into a DC voltage of a variable voltage. As described above, the adaptor 300 changes an output voltage by adjusting an offset voltage in response to a voltage change request signal of the central controller 122. With reference to FIG. 1b, an embodiment of the adaptor 300 will be described in detail. It would be appreciated by those skilled in the art that other embodiments are possible without departing from the principles and spirit of the invention.

The adaptor 300 includes a communication controller 310 and an output voltage controller 320. The communication controller 310 receives a voltage change communication signal from the transmission controller 120 of the wireless power transmission apparatus 100. The communication controller 310 then filters and transmits the voltage change communication signal to the output voltage controller 320.

The output voltage controller 320 sets a DC voltage value, which is outputted to the wireless power transmission apparatus 100, based on the voltage change communication signal. That is, the output voltage controller 320 increases or decreases the output DC voltage according to the voltage change communication signal such that the wireless power transmission apparatus 100 receives the requested voltage.

As described above, when the output voltage from the adaptor is controlled directly by the wireless power transmission apparatus, manufacturing costs may be decreased by reducing the number of components and wireless power transmission efficiency may be increased.

A power control method in a wireless power transmission assembly according to an exemplary embodiment of the present application having the above-mentioned configuration will be described in detail with reference to FIG. 2.

Figure 2:
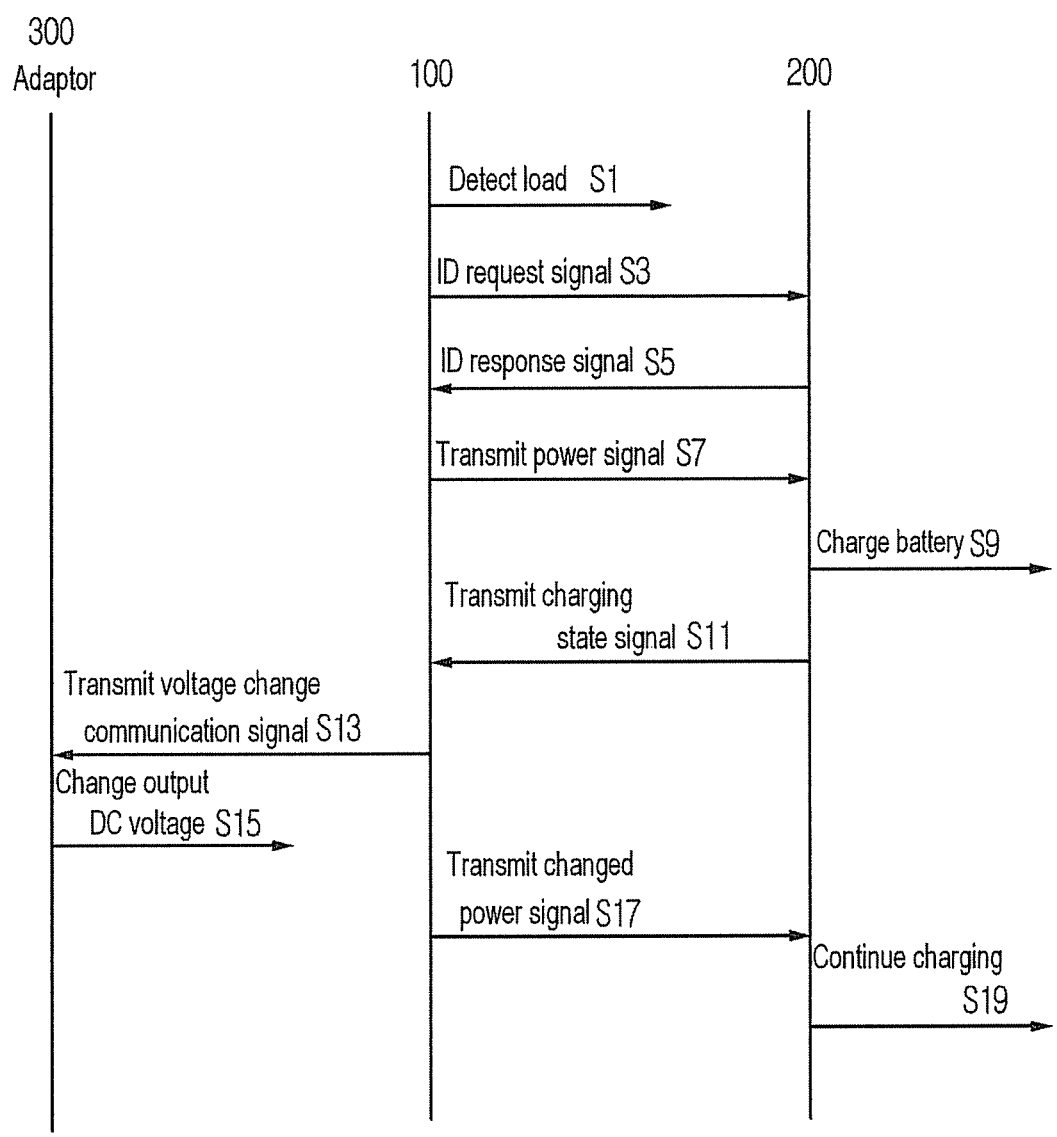
FIG. 2 is a flowchart describing a power control method in the wireless power transmission assembly according to an exemplary embodiment.

FIG. 2 is a flowchart describing the power control method in the wireless power transmission assembly according to an exemplary embodiment. It would be appreciated by those skilled in the art that other embodiments are possible without departing from the principles and spirit of the invention.

As shown in FIG. 2, when a foreign object is placed on a charging position where the transmission coil 110 of the wireless power transmission apparatus 100 is located, a load change of the transmission coil 110 is detected at operation S1 and an ID request signal is transmitted at operation S3. If the foreign object is the wireless power receiving apparatus 200, the wireless power receiving apparatus 200, in reaction to the ID request signal, transmits an ID response signal to the wireless power transmission apparatus 100 at operation S5. Accordingly, the wireless power transmission apparatus 100 receiving the ID response signal confirms that the foreign object is the wireless power receiving apparatus 200 and transmits a wireless power signal via the transmission coil 110 at operation S7. When there are two transmission coils, the transmission controller 120 detects at which one of the two transmission coils 111 and 112 the wireless power receiving apparatus 200 is placed, selects this transmission coil, and transmits the wireless power signal via the selected transmission coil. To be specific, after the wireless power transmission apparatus 100 transmits the ID request signal through the two transmission coils 111 and 112, a transmission coil which receives an ID response signal is recognized as the selected transmission coil.

The wireless power receiving apparatus 200, upon receiving the wireless power signal, rectifies the wireless power signal via the rectifier 220 and charges the battery cell module 230 with the rectified power at operation S9.

When the wireless power receiving apparatus 200 is receiving a wireless power signal, it transmits a charging state signal, including voltage level information and a battery charging state information, to the wireless power transmission apparatus 100 via the reception coil 210 at operation S11. Based on the charging state signal, the wireless power transmission apparatus 100 transmits a voltage change communication signal to the adaptor 300 at operation S13. The voltage change communication signal may be any one of a power up signal, a power down signal, a full charge signal, or a charging error signal, based on the charging state signal from the wireless power receiving apparatus 200.

Accordingly, when the wireless power signal needs to be changed, the wireless power transmission apparatus 100 transmits a voltage change communication signal to the adaptor 300 at operation S13. The voltage change communication signal may be transmitted via a communication line or a plus line, among other methods. These various transmission processes will later be described below in detail with reference to FIGS. 3a and 3b.

With reference to FIG. 1b again, the adaptor 300, upon receiving the voltage change communication signal, increases or decreases an output voltage by changing a voltage offset at operation S15. Accordingly, the wireless power signal is changed at operation S17 and proper charging continues at operation S19.

According to an exemplary embodiment of the present document having the above-mentioned configuration, when the output voltage from the adaptor is controlled directly by the wireless power transmission apparatus, manufacturing costs may be decreased by reducing the number of components, and wireless power transmission efficiency may be increased.

Figure 3A:
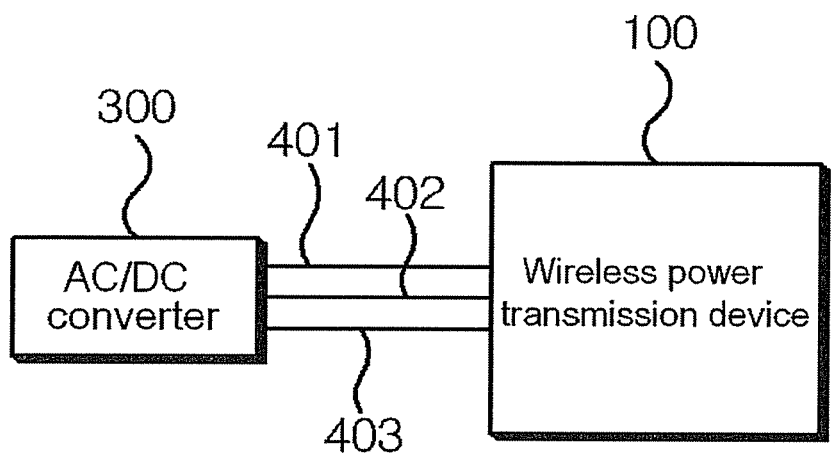
FIG. 3a is a view showing a connection relation of the adaptor and a wireless power transmission apparatus of the wireless power assembly according to an exemplary embodiment.
Figure 3B:
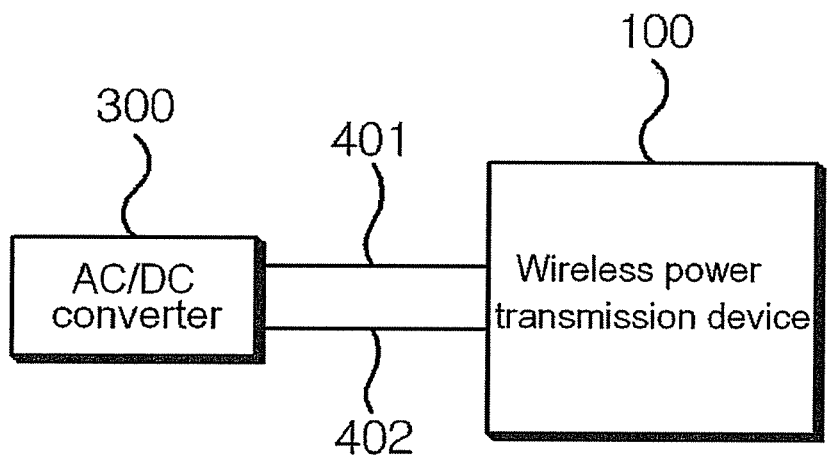
FIG. 3b is a view showing a connection relation of the adaptor and the wireless power transmission apparatus of the wireless power assembly according to another exemplary embodiment.

The next paragraphs will describe in detail, with reference to FIGS. 3a and 3b, a connection relation of the adaptor and the wireless power transmission apparatus of the wireless power assembly according to two exemplary embodiments. It would be appreciated by those skilled in the art that other embodiments are possible without departing from the principles and spirit of the invention.

FIGS. 3a and 3b are views showing the connection relation of the adaptor and the wireless power transmission apparatus of the wireless power assembly according to two exemplary embodiments.

FIG. 3a shows an embodiment where the adaptor 300 and the wireless power transmission apparatus 100 are connected by three lines. As shown in FIG. 3a, the adaptor 300 and the wireless power transmission apparatus 100 are connected by a plus line 401, a ground line 402, and a communication line 403. The transmission controller 120 of the wireless power transmission apparatus 100 may transmit a voltage change communication signal as an amplitude modulation signal to the adaptor 300 via the communication line 403. Alternatively, the voltage change communication signal may be transmitted as a serial communication signal via the communication line 403. The level of the output voltage is changed according to the instructions of the voltage offset of the adaptor 300 when it receives the amplitude modulation signal or the serial communication signal.

FIG. 3b shows an embodiment where the adaptor 300 and the wireless power transmission apparatus 100 are connected by two lines. As shown in FIG. 3b, the adaptor 300 and the wireless power transmission apparatus 100 are connected via the plus line 401 and the ground line 402. The transmission controller 120 of the wireless power transmission apparatus 100 transmits a voltage change communication signal through the plus line 401 using DC modulation. Upon receiving the request signal, the communication controller 310 of the adaptor 300 analyzes the signal and the output voltage controller 320 correspondingly changes the level of the output voltage.

Figure 4A:
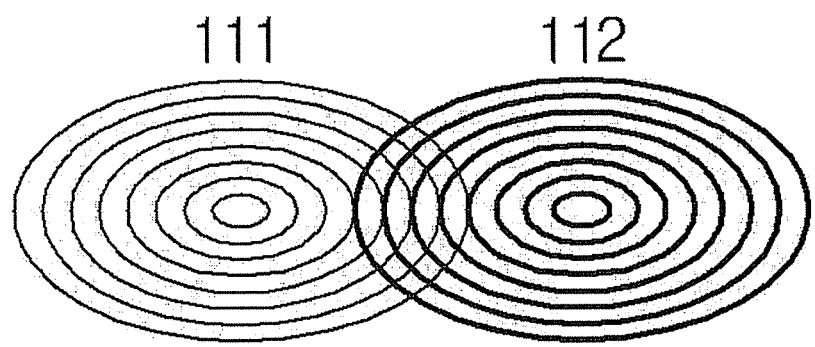
FIG. 4a is a view showing a structure of the plurality of transmission coils used in the wireless power transmission apparatus according to an exemplary embodiment.
Figure 4B:
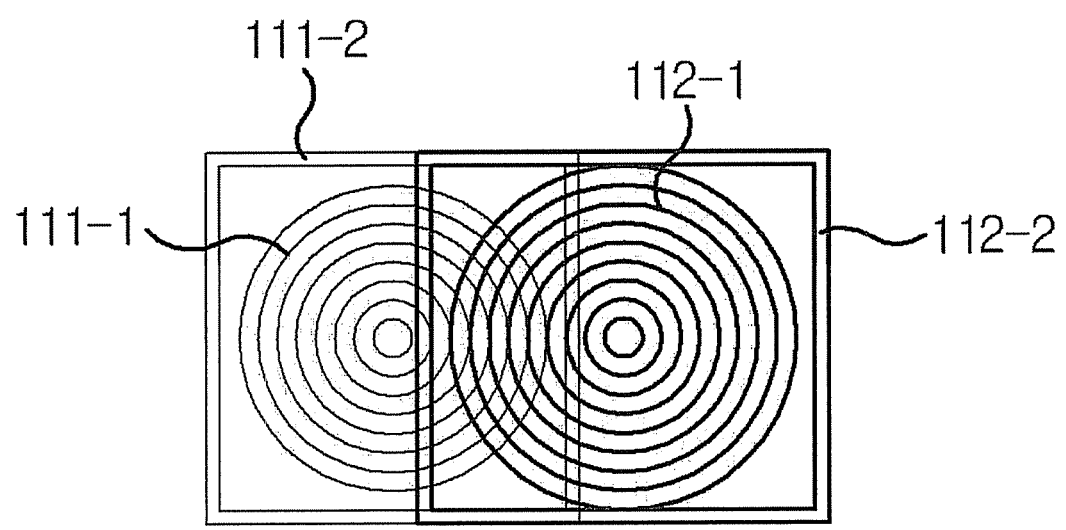
FIG. 4b is a view showing a structure of the plurality of transmission coils used in the wireless power transmission apparatus according to another exemplary embodiment.

The next paragraphs will describe in detail, with reference to FIGS. 4a and 4b, examples of a plurality of transmission coils.

FIGS. 4a and 4b are views showing a configuration of a plurality of transmission coils used in the wireless power transmission apparatus according to two possible embodiments. It would be appreciated by those skilled in the art that other embodiments are possible without departing from the principles and spirit of the invention.

As shown in FIG. 4a, in the wireless power transmission apparatus 100, the first transmission coil 111 and the second transmission coil 112 may have the same shape and size. The first transmission coil 111 and the second transmission coil 112 have an overlapping region. The first transmission coil 111 and the second transmission coil 112 may each be an oval coil.

As shown in FIG. 4b, each of the first and second transmission coils 111 and 112 may have a shape that combines a circular coil and a square coil. That is, as shown, in the first transmission coil 111 and the second transmission coil 112, circular coils 111-1 and 112-1 form an inner region and square coils 111-2 and 112-2 form an outer region.

Since the transmission coil configuration of FIG. 4b has the power transmission efficiency of the circular coil and the stability of the square coil, it is possible to reduce the dead zone where the wireless power receiving apparatus 200 cannot receive power and maintain the power transmission efficiency at the same time.

Figure 5A:
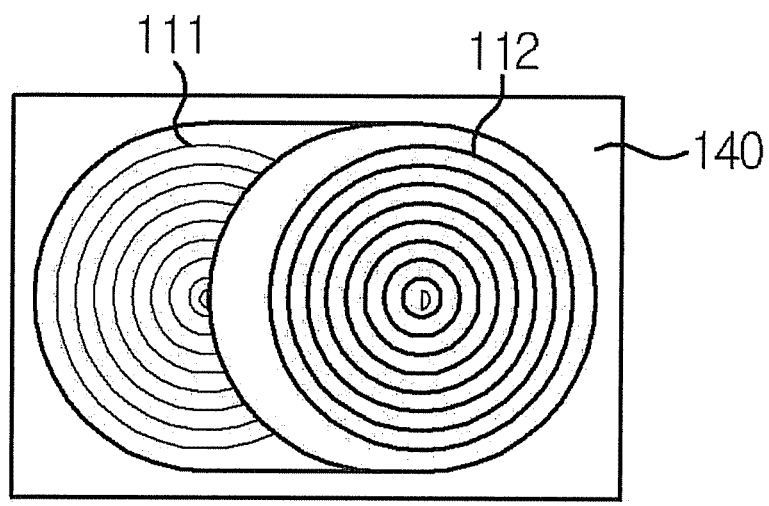
FIG. 5a is a plan view showing a shield core accommodating a plurality of transmission coils used in the wireless power transmission apparatus according to an exemplary embodiment.
Figure 5B:
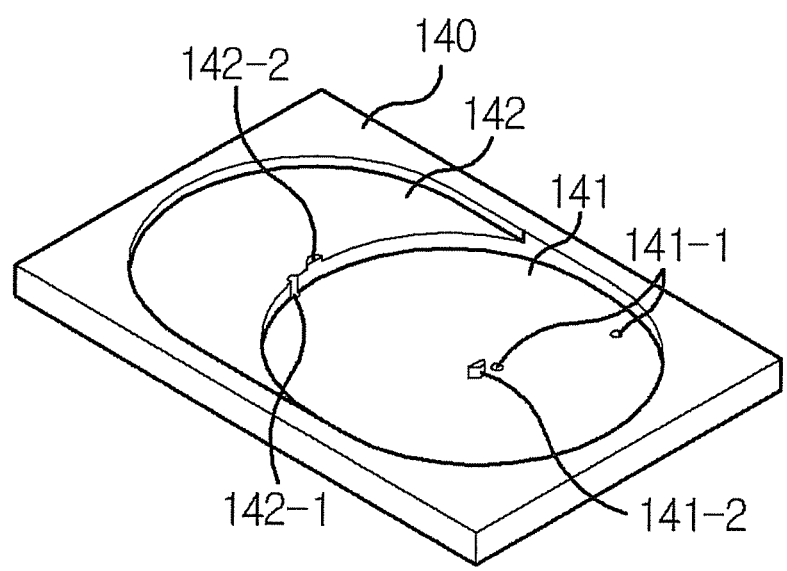
FIG. 5b is a perspective view showing the shield core accommodating the plurality of transmission coils used in the wireless power transmission apparatus according to another exemplary embodiment.

The next paragraphs will describe in detail, with reference to FIGS. 5a and 5b, a shield core into which the oval coil used in FIG. 4a is inserted.

FIG. 5a is a plan view showing a shield core accommodating a plurality of transmission coils used in the wireless power transmission apparatus 100 according to an exemplary embodiment. FIG. 5b is a perspective view showing the shield core accommodating the plurality of transmission coils used in the wireless power transmission apparatus 100 according to another exemplary embodiment. As shown, a shield core 140 has a flat square plate shape and includes a first recess portion 141 to insert the first transmission coil 111 and a second recess portion 142 to insert the second transmission coil 112. As shown, a step difference is formed between the first recess portion 141 and the second recess portion 142. Openings 141-1 and 142-1 to insert a lead line are located at a side surface and at a center of each recess portion. Protrusions 141-2 and 142-2 to fix the transmission coil in place are respectively located at each center of the concave portions 141 and 142. The shield core may include any one of a ferrite series of an amorphous system, such as Mn—Zn (50 parts by weight:50 parts by weight), Ni—Fe (80 parts by weight:20 parts by weight), or fine-metal (Fe—Si—Cu—Nb). It would be appreciated by those skilled in the art that other alloys are possible without departing from the principles and spirit of the invention.

The above-mentioned shield core protects the transmission controller 120 of the wireless power transmission apparatus 100 from damage by a magnetic field generated from the first transmission coil 111 and the second transmission coil 112, and increases power transmission efficiency.

According to an exemplary embodiment of the present application, when the output voltage from the adaptor is controlled directly by the wireless power transmission apparatus, manufacturing costs may be decreased by reducing the number of components and wireless power transmission efficiency may be increased.

Although a few embodiments of the present invention have been shown and described, it would be appreciated by those skilled in the art that changes may be made in this embodiment without departing from the principles and spirit of the invention, the scope of which is defined in the claims and their equivalents. It would be further appreciated that all or the part of the exemplary embodiments may be selectively combined and configured for additional modification.

What is claimed is:

1. A method performed by a transmission controller in a wireless power transmission apparatus, the method comprising:
   receiving a first direct current voltage from an adaptor connected to the wireless power transmission apparatus by at least a plus line and a ground line;
   transmitting a wireless power signal to a wireless power receiving apparatus, if the wireless power receiving apparatus is detected, by using at least one transmission coil, the wireless power signal based on the first direct current voltage received from the adaptor;
   determining, based on a signal from the wireless power receiving apparatus, status information indicating a level of charged power in a battery of the wireless power receiving apparatus;
   transmitting a voltage change communication signal to the adaptor based on the status information, wherein the voltage change communication signal comprises a power up signal or a power down signal for causing the adapter to adjust a level of direct current voltage provided by the adapter to the wireless power transmission apparatus via the plus line in response to the level of charged power in the battery of the wireless power receiving apparatus;
   receiving, from the adaptor, a second direct current voltage, wherein the second direct current voltage is based on the voltage change communication signal; and
   transmitting the wireless power signal to the wireless power receiving apparatus based on the second direct current voltage received from the adaptor.

2. The method of claim 1, wherein the adaptor and the wireless power transmission apparatus are further connected by a communication line, and wherein the voltage change communication signal is transmitted to the adaptor in the form of an amplitude modulation signal or a serial communication signal through the communication line.

3. The method of claim 1, wherein the wireless power transmission apparatus comprises a first transmission coil and the second transmission coil, and the method further comprises:
   transmitting the wireless power signal through the first transmission coil if the wireless power receiving apparatus is detected by the first transmission coil; and
   transmitting the wireless power signal through the second transmission coil if the wireless power receiving apparatus is detected by the second transmission coil.

4. The method of claim 1, wherein the voltage change communication signal is transmitted to the adaptor through the plus line by direct current (DC) modulation.

5. The method of claim 1, wherein transmitting the voltage change communication signal comprises:
   transmitting the voltage change communication from a transmission controller of the wireless power transmission apparatus to a communication controller of the adaptor to cause the adapter to adjust the level of the direct current voltage by adjusting an offset voltage of the adaptor.

6. A wireless power transmission apparatus, comprising:
   circuitry configured to receive a first direct current voltage from an adaptor connected to the wireless power transmission apparatus by at least a plus line and a ground line;
   at least one transmission coil configured to transmit a wireless power signal to a wireless power receiving apparatus, if the wireless power receiving apparatus is detected, the wireless power signal based on the first direct current voltage received from the adaptor;
   a converter configured to supply a power to the at least one transmission coil;
   a driver configured to control operation of the converter;
   a transmission controller configured to:
      determine, based on a signal from the wireless power receiving apparatus, status information indicating a level of charged power in a battery of the wireless power receiving apparatus,
      transmit a voltage change communication signal to the adaptor based on the status information, wherein the voltage change communication signal comprises a power up signal or a power down signal for causing the adapter to adjust a level of direct current voltage provided by the adapter to the wireless power transmission apparatus via the plus line in response to the level of charged power in the battery of the wireless power receiving apparatus, and
      receive, from the adaptor, a second direct current voltage, wherein the second direct current voltage is based on the voltage change communication signal; and
   the at least one transmission coil configured to transmit the wireless power signal to the wireless power receiving apparatus based on the second direct current voltage received from the adaptor.

7. The wireless power transmission apparatus of claim 6, wherein the adaptor and the wireless power transmission apparatus are further connected by a communication line, and the transmission controller transmits the voltage change communication signal to the adaptor in the form of an amplitude modulation signal or a serial communication signal through the communication line.

8. The wireless power transmission apparatus of claim 6, wherein the wireless power transmission apparatus comprises a first transmission coil and a second transmission coil, and the transmission controller is configured to detect the wireless power receiving apparatus at the first transmission coil and the second transmission coil, and to cause transmission of the wireless power signal through the transmission coil where the wireless power receiving apparatus is detected.

9. The wireless power transmission apparatus of claim 8, wherein the transmission controller detects the wireless power receiving apparatus through the load modulation of the first transmission coil and the second transmission coil.

10. The wireless power transmission apparatus of claim 6, wherein the transmission controller transmits the voltage up signal or the voltage down signal through the plus line using DC modulation.

11. The wireless power transmission apparatus of claim 6, wherein the transmission controller transmits the voltage change communication to a communication controller of the adaptor to cause the adapter to adjust the level of the direct current voltage by adjusting an offset voltage of the adaptor.

* * * * *